(No Model.)
A. OVERBAGH.
DEVICE FOR MEASURING THE STRAIN ON FENCE WIRES.
No. 310,845. Patented Jan. 13, 1885.
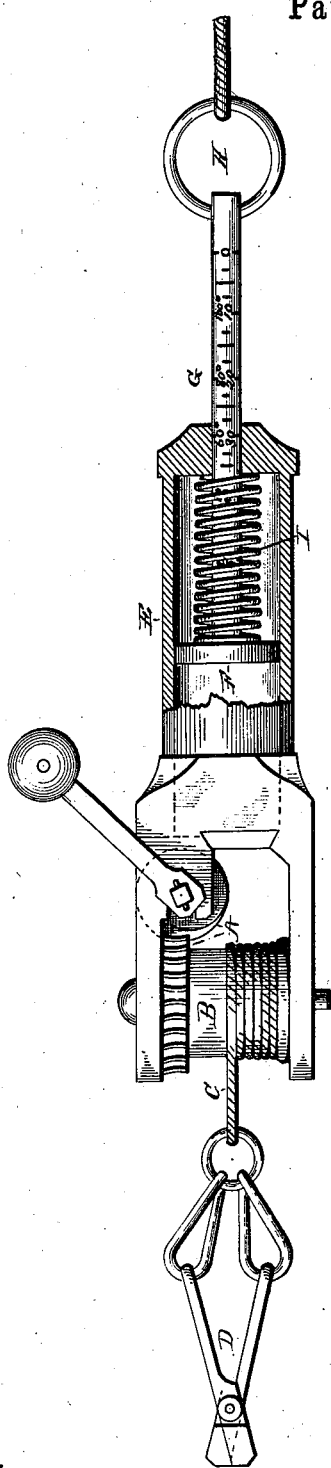
WITNESSES
Edwin L. Yewell.
J. J. McCarthy.
INVENTOR
Addison Overbagh
By C. M. Alexander
ATTORNEY

United States Patent Office.

ADDISON OVERBAGH, OF COXSACKIE STATION, NEW YORK.

DEVICE FOR MEASURING THE STRAIN ON FENCE-WIRES.

SPECIFICATION forming part of Letters Patent No. 310,845, dated January 13, 1885.

Application filed June 6, 1884. (No model.)

*To all whom it may concern:*

Be it known that I, ADDISON OVERBAGH, a citizen of the United States, residing at Coxsackie Station, in the county of Columbia and State of New York, have invented certain new and useful Improvements in Devices for Measuring the Strain on Fence-Wires, &c., of which the following is a specification, reference being had therein to the accompanying drawing.

My invention relates to devices for measuring the strain on fence-wires, &c., and is designed to produce a device whereby an equal strain may be given to each wire, and also allowance may be made for temperature changes or other incidentals.

In describing the device reference will be had to the annexed drawing, showing a plan view, partly in section, of the device attached to a wire-strainer, which, as shown, consists of a worm-gear, A, operating a drum, B, around which is wound a rope, C, connected to the wire tongs D.

The frame of the strainer proper is either formed integral with or secured to the casing E of the strain-measurer. This casing is shown as a headed cylinder in the drawing, but may be of any form best adapted to the purpose. Within the cylinder is a head, F, secured to a rod, G, which passes without the said cylinder, and has at the said outer end a ring, H, as shown. Between the head of the cylinder and the head of the rod is a spiral spring, I, surrounding the rod and operating to normally keep the rod within the said cylinder. The rod has marked on it a scale properly adjusted.

There has been shown and described but one of many forms in which the device may be constructed—as, for example, a bow-spring may be used in place of the spiral spring, and a fixed scale and a movable arm may be used in place of the movable scale arm or rod.

Either end of the device may be connected to the wire and the other to a post or other fixed point and operated after the usual manner to stretch the wire. As the tension becomes greater the amount is indicated by the measurer, and when the proper tension has been attained the wire is secured in place and another wire treated in the same manner.

It is a well-known fact that metal contracts and expands under the influence of different degrees of temperature, and in rods or wire this is chiefly longitudinal, and exerts in fence-wire a strain which, if not allowed for, would break the wire. The measurer entirely obviates this, as it shows the strain on the wire, and it is not guessed at. The rod G is provided with two scales, one showing the strain applied to the wire and the other the degree of atmospheric temperature at which any certain amount of strain should be applied. The two scales are relative one to the other, the higher the temperature the less the strain to be applied, as the contraction of the wire as the heat lessens will bring a greater strain thereon. If this were not allowed for, the wires would sag in warm weather or snap in cold weather. By the means described the stretching of the wires so they will remain taut at all times is reduced to a certainty. The two scales are placed coincident, so that both may be seen at a glance.

Having described the device, what I claim is—

1. In combination with a mechanism for stretching fence-wires, a measurer having coincident and relative scales to indicate the amount of strain to be applied for a known degree of temperature, substantially as and for the purpose specified.

2. In a wire stretcher for wire fences, the combination of a worm-gear, drum, tongs, and connections, with a spring-retained scale arm or rod, said rod containing a ring at its outer end, substantially as and for the purpose set forth.

In testimony whereof I affix my signature in presence of two witnesses.

ADDISON OVERBAGH.

Witnesses:
C. B. VAN DE CARR,
WILLIAM CLEARY.